(No Model.)

H. C. WEEDEN.
WATER CLOSET AND SIMILAR STRUCTURES.

No. 308,935. Patented Dec. 9, 1884.

WITNESSES
J. Henry Taylor,
James F. Bligh

INVENTOR
Henry C. Weeden
by Alex. P. Browne
attorney

UNITED STATES PATENT OFFICE.

HENRY C. WEEDEN, OF BOSTON, MASSACHUSETTS.

WATER-CLOSET AND SIMILAR STRUCTURES.

SPECIFICATION forming part of Letters Patent No. 308,935, dated December 9, 1884.

Application filed April 14, 1884. (No model.)

*To all whom it may concern:*

Be it known that I, HENRY C. WEEDEN, of Boston, in the county of Suffolk and State of Massachusetts, a citizen of the United States, have invented certain new and useful Improvements in Water-Closets and Similar Structures, of which the following is a specification.

My invention relates to automatic water-closets, and has for its object to provide improvements in such apparatus.

Figure 1:
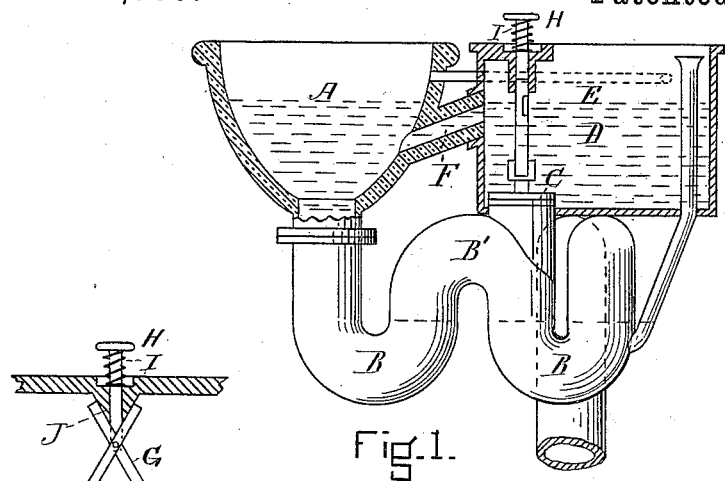
Figures 2, 3:
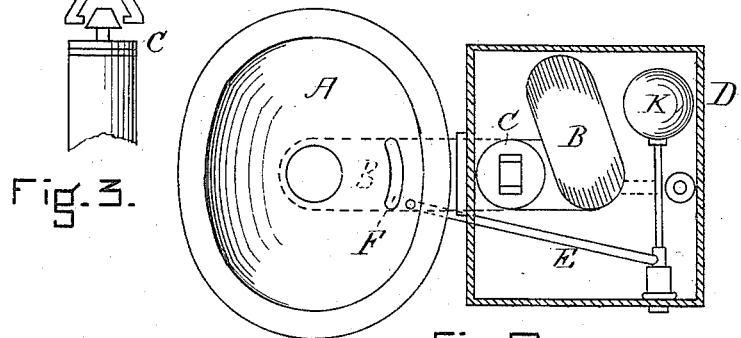

In the accompanying drawings, Figure 1 represents in sectional elevation a water-closet embodying my improvements. Fig. 2 is a top or plan view of the same; and Fig. 3 represents in section a variation in construction, hereinafter described; and Fig. 4, an enlarged view of a portion of the apparatus, hereinafter described.

I will now proceed to describe the apparatus represented in the drawings, which I believe to embody my present invention in the best form now known to me.

In the drawings, A represents the basin of an ordinary water-closet, connected with a double-trapped outlet-pipe, B. The portion of this outlet-pipe between the two traps, which portion I have lettered B', is provided with a valve or cover, C, which normally acts to close the part B', so that when water stands in the traps B B the air in the intermediate part, B', forms an air-seal. An extension of the part B' enters a tank or water-tight basin, D, as shown, so that when the valve or cover C is raised the part B' communicates with the interior of the tank or basin D. The other extremity of the double trap is connected with the soil-pipe or other similar receptacle.

The supply of water to the basin A is obtained through a pipe, E, which, for a reason hereinafter given, should be of comparatively small cross-section relatively to that of the outlet of the basin A. Water may be supplied to the tank D from the bowl A through a passage, (shown at F,) which I prefer, or by a branch, F', of the pipe E, (see Fig. 3,) which should be of sufficient relative capacity to fill the tank D while the other part of the pipe E is supplying and filling the bowl A. The flow of water in both tank and bowl I regulate by a ball-cock, K. (See Fig. 2.) An overflow-pipe from the tank D leads into that portion of the double trap B which is on the sewer or drain side of the air-seal. The object of this construction and location of the overflow-pipe will be pointed out later.

Figure 4:
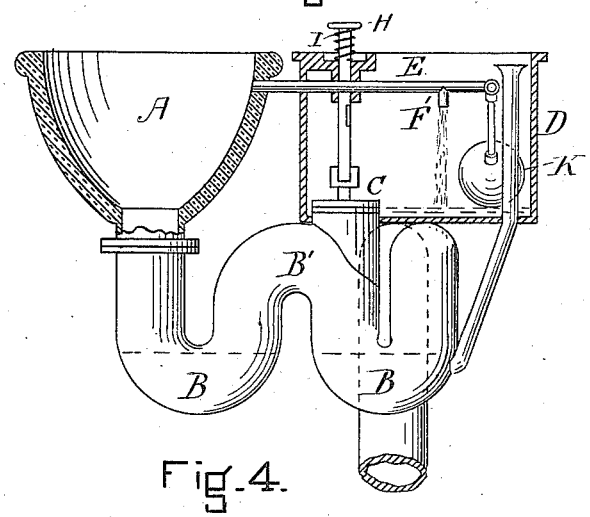

To raise the valve C from its seat, I provide it with a notch-shaped attachment, as shown in Fig. 4, adapted to be embraced by a pair of tongs or grippers, G, carried upon a spindle, H, against the action of a coiled spring, I. These tongs are overbalanced, so as normally to close, and are opened by the wedge action of a wedge, J, as shown. The upper portion of the spindle bears against the under side of the hinged seat of the closet, so that the weight of the occupant upon the seat will force it down, thus causing the tongs G to engage with the notch upon the valve or cover C, in the manner hereinafter described.

The operation of the apparatus is as follows: Assuming the whole to be empty, the fall of the ball-cock K admits water through the pipe E to the basin A, and thence to the double trap B, until its two traps are filled with water, the space between at B' constituting an air-seal, and, by a well-known law of hydrostatics, preventing the outflow of water through the double trap B to the drain or sewer. The further rising of the water fills the basin A and the connected tank D (through the passage F) until the water stands therein at a level, which closes the ball-cock. This is the normal condition of the apparatus when not in use, and is indicated in Fig. 1 by dotted level lines. When the closet is occupied, the weight of the occupant, forcing down the spindle H, causes the overbalanced tongs G to engage with the notch upon the valve or cover C, and when the weight of the occupant is removed the spring I, lifting the spindle H and the tongs G and the valve or cover C, breaks the air-seal at B', and the water from the tank D rushes into the double trap B, converting it into a siphon, so that it siphons off the water from the bowl A, its siphon action continuing until the seal of the trap B is broken and the air readmitted to the part B'. Meanwhile the rise of the spindle H under the action of the spring I has brought the tongs against the wedge J, which has opened them and disengaged the valve or cover C, which falls back to its place and closes the outlet from B'. The withdrawal of the water from the tank D has dropped the ball-cock K, thereby opening the flow through E into the basin A, which continues until, in the manner originally described herein, the air-seal at B' being re-formed, the normal water-level is restored, the ball-cock closes, and the apparatus is ready to be used again.

It has been said that the overflow from the tank D leads into that one of the two traps in the double trap B which is on the sewer or drain side of the air-seal. This is done in order that the overflow-pipe may itself be trapped, and at the same time may afford an escape to the sewer of the surplus water when for any reason the ball-cock K fails to operate and close the supply-pipe E at the proper time.

The particular device shown for automatically engaging and disengaging the valve or cover C is desirable, because, being automatic, it operates with no attention from the occupant of the closet.

It is obvious that other automatic clutch arrangements may be devised, or that the cover C may, by means of a rod or cord, be raised by the occupant of the seat; but this latter construction is objectionable for the same reason that applies to all non-automatic devices of this character—namely, the liability of failure to operate them through the neglect or carelessness of the person using the closet.

Instead of the ball-cock for closing the supply for the bowl, and also the supply for creating the siphon in the outlet-pipe, any other suitable device may be employed; but I prefer the ball-cock on account of its simplicity and compactness.

The method of supplying both the bowl and the tank D with water by a single inlet, and the connection from the bowl to the tank, I consider preferable, although, as I have shown, a separate supply for each may be provided, and the connection between the bowl and tank thereby dispensed with.

I claim—

1. In a water-closet or similar structure, a double-trap pipe connected on one side of its double trap with the bowl of the closet, on the other side of its double trap with the soil-pipe, and at the part lying between its two trap-forming portions with a water-supply tank, all substantially as herein set forth.

2. In a water-closet or similar structure, a double-trap pipe connected on one side of its double trap with the bowl of the closet, on the other side of its double trap with the soil-pipe, and at the part lying between its two trap-forming portions with a water-supply tank, the passage from the said tank to the said intermediate part of the double-trap pipe being provided with a valve closing air-tight toward the interior of the said double-trap-pipe, all substantially as herein set forth.

3. In a water-closet or similar structure, a double-trap pipe connected on one side of its double trap with the bowl of the closet, on the other side of its double trap with the soil-pipe, and at the part lying between its two trap-forming portions with a water-supply tank, and a suitable valve opening and closing device arranged to operate the said valve from without, all substantially as herein set forth.

4. In combination, a water-closet bowl, a double-trapped outlet-pipe having its air-seal part provided with a removable valve or cover, a water-tank communicating with said air-seal part when the valve or cover is opened, a water-passage from said bowl to said tank, and a suitable valve opening and closing device arranged to operate from without for opening and closing the said air-seal, valve, or cover, all substantially as herein set forth.

5. In a water-closet or similar structure, a double-trap pipe connected on one side of its double trap with the bowl of the closet, on the other side of its double trap with the soil-pipe, and at the part lying between its two trap-forming portions with a water-supply tank, in combination with an overflow-pipe connecting said tank with that one of the two traps in the double-trap pipe which lies next the soil-pipe and entering the said trap below the level of its water-seal, all substantially as herein set forth, and for the purposes herein specified.

In testimony whereof I have hereunto subscribed my name this 10th day of April, A. D. 1884.

HENRY C. WEEDEN.

Witnesses:
J. HENRY TAYLOR,
JAMES F. BLIGH.